March 14, 1961     M. W. GREEN     2,975,349

LOAD CONTROL MOTOR CIRCUIT

Filed Oct. 27, 1955

INVENTOR.
MILTON W. GREEN
BY
ATTORNEY

United States Patent Office 2,975,349
Patented Mar. 14, 1961

2,975,349
LOAD CONTROL MOTOR CIRCUIT

Milton W. Green, Princeton, N.J., assignor to Radio Corporation of America, a corporation of Delaware Filed Oct. 27, 1955, Ser. No. 543,077

23 Claims. (Cl. 318—331)

The present invention relates to an improved electrical control circuit.

It is a general object of the invention to provide an improved circuit for preventing an electrical load from drawing an excessive amount of current.

It is another object of the invention to provide an arrangement for preventing a motor from drawing excessive current when it starts.

Yet another object of the invention is to provide an improved circuit for controlling the speed of a motor.

Another object of the invention is to provide an improved electrical circuit for maintaining a motor operating at a constant speed in spite of variations in the load driven by the motor.

Another object of the invention is to provide improved circuits for controlling the operating characteristics of a motor utilizing the advantageous characteristics of semiconductive devices known as "transistors."

According to the invention, a constant current device such as a transistor is placed in series circuit with the armature of the motor which is to be controlled. The series circuit is adapted to be connected across a source of direct potential. The electrical bias for the constant current device may be derived from the source. If the bias is maintained at a constant value, the current through the constant current device will remain constant, whereby the current drawn by the armature cannot exceed a predetermined value, regardless of variations in the voltage across the armature.

In a preferred form of the invention, means are provided responsive to momentary changes in the voltage across the armature for changing the bias on the constant current device. The change in bias causes a change in armature current. The change in armature current is in a sense opposite to that of the change in armature voltage, whereby the effect of the armature voltage change is counteracted.

In one form of the invention, the bias adjusting means comprises a storage capacitor connected to the motor armature and in series with the transistor base-to-emitter circuit. In another form of the invention, the bias adjusting means is connected in series with the motor armature and the transistor base-to-emitter circuit. In this form of the invention the circuit provides high starting torque, and extra torque during momentary overloads. A third form of the invention includes a pair of transistors in the motor control circuit. When the motor speed changes an error signal is developed which is amplified by one of the transistors and supplied as a bias to the other transistor in such sense as to change the armature current to compensate for load variations. In this form of the invention, the control circuit maintains the motor speed substantially constant.

The invention will be described in greater detail by reference to the following description taken in connection with the accompanying drawing in which.

Figure 1:
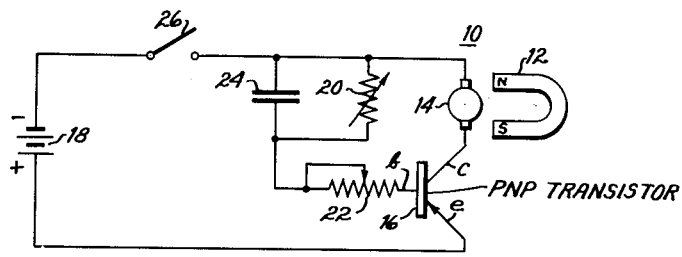
Figure 1 is a schematic circuit diagram of one form of the present invention.

Referring to Figure 1, motor 10 includes a permanent magnet field 12 and an armature 14. The armature is in series with the collector-to-emitter circuit of transistor 16 and a source of power, shown in Figure 1 as a battery 18. The transistor is forward biased through potentiometer 20 and resistor 22. Potentiometer 20 and resistor 22 are connected in series with the base-to-emitter circuit of the transistor. (In this figure and the following ones the base, collector and emitter of the transistor are legended $b$, $c$ and $e$, respectively.) Condenser 24 is inserted in the circuit to permit the motor armature to draw more current when the motor starts than during the normal motor operation, as will be explained more fully below.

In operation, when switch 26 is closed, armature 14 has a tendency to draw a considerable amount of current. However, the bias current through potentiometer 20, resistor 22 and the base-to-emitter circuit of the transistor limits the amount of current drawn by the transistor to a predetermined value. Since the motor armature 14 is in the collector-to-emitter circuit of the transistor, it also can draw only a predetermined amount of current. In the absence of condenser 24, this amount of current may be insufficient to start the motor operating with the desired amount of starting torque. Condenser 24 overcomes this deficiency. When the switch is first closed, the condenser charges. The charging circuit includes resistor 22 and the base-to-emitter circuit of the transistor. Thus, until the condenser is fully charged, the base-to-emitter circuit draws more than its normal amount of current. This causes the transistor to draw more than its normal amount of collector-to-emitter current, whereby the current through the motor armature is increased and the motor starting torque is increased.

Motor speed may be varied by variation of potentiometer 20. The amount of starting torque can be adjusted by adjusting the effective value of resistor 22 and thereby changing the amount of bias current at the moment of starting.

Figure 2:
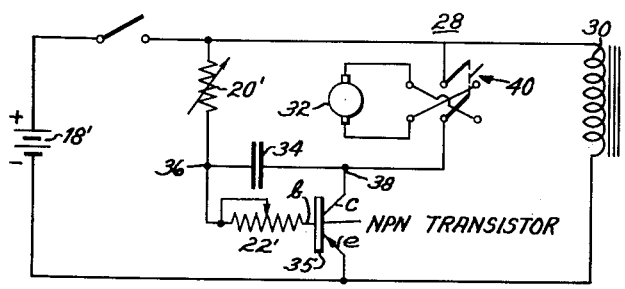
Figure 2 is a schematic circuit diagram of another form of the invention.

In the arrangement shown in Figure 2, the motor starting torque is relatively high and the motor also delivers extra torque during momentary motor overloads. Potentiometer 20' and resistor 22' are analogous to potentiometer 20 and resistor 22 in Figure 1. The motor 28 includes a shunt field 30 and an armature 32. Capacitor 34 is arranged in series with armature 32 and the base-to-emitter circuit of transistor 35.

When the motor of Figure 2 starts, capacitor 34 acts in a way analogous to capacitor 24 of Figure 1. The instantaneous closing of the switch causes the capacitor to charge through the armature, resistor 22 and the base-to-emitter circuit of transistor 35. Thus, during the charging interval, the transistor forward biasing current increases. The transistor amplifies this current so that the starting current through the transistor collector-to-emitter circuit and the motor armature is at a relatively high value and high starting torque is developed. During the time the motor is running at its normal speed, the voltage at junction 36 bears a substantially predetermined relationship to the voltage at junction 38, whereby condenser 34 does not charge or discharge to any significant extent. However, when the load on the motor changes, the armature voltage changes. The voltage at junction 38 now changes and condenser 34 momentarily charges or discharges through the base-to-emitter circuit, whereby the current through the collector-to-emitter circuit and motor armature also changes. The sense of the armature current change is opposite to that of the armature voltage change, whereby the motor torque tends to remain constant. The change in armature current will persist only until condenser 34 becomes charged or discharged to some new, quiescent value so that a continuous overload is still protected against.

The transistor shown in Figure 1 is of a so-called PNP type, whereas the transistor shown in Figure 2 is of the NPN type. It will be understood that either one can be used in either circuit depending upon the polarity of the source. The motor shown in Figure 1 is a permanent magnet type motor, whereas the one shown in Figure 2 is a shunt field motor. Either one can be used in either circuit or in the circuit of Figure 3. Figure 2 shows a switch 40 for reversing the leads of armature 32 thereby reversing the direction of armature rotation. This feature is equally applicable to the circuit of Figure 1 or 3. Finally, although the embodiments of Figures 1 and 2 are shown as being applicable to the control of a D.C. motor from a D.C. source, the invention is applicable also to the control of a D.C. motor from an A.C. source. In this last mode of operation it is preferable that the transistor employed has a reverse emitter-to-base current gain ($\alpha_{eb}$) which is substantially smaller than the current gain of the collector-to-base circuit ($\alpha_{cb}$).

Figure 3:
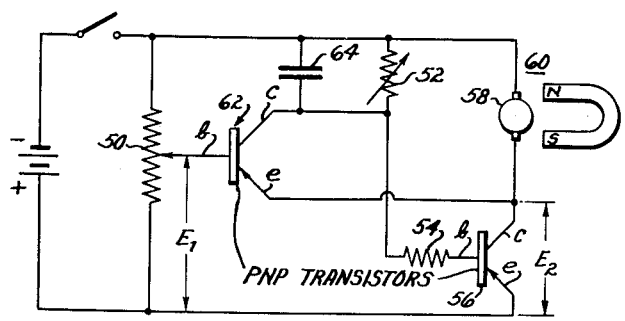
Figure 3 is a schematic circuit diagram of a third form of the invention.

The circuit shown in Figure 3 is one in which the speed of the motor is adjustable and is independent of load. This circuit also has the advantageous characteristics of the circuit in Figure 1. Motor speed is adjusted by adjusting the potentiometer 50. This determines the potential $E_1$. The values of potentiometer 52 and resistor 54 determine the amount of forward biasing current passing through transistor 56 and accordingly the amount of current in the collector-to-emitter circuit on the transistor. A predetermined amount of current now flows in the armature 58 of motor 60 and the motor rotates at a given speed. At this speed, the potential $E_2$, which is the difference in potential between the armature voltage and the line voltage, is approximately equal to $E_1$. Thus, there is substantially no difference in potential between the base and emitter of transistor 62 and no current flows in this circuit.

When the load on the motor changes, the armature potential changes and $E_2$ also changes. $E_1$ minus $E_2$ is now some finite value and current flows in the base-to-emitter circuit of transistor 62. The transistor amplifies this current, whereby the potential drop across potentiometer 52 changes and transistor 56 has a different biasing current applied thereto. This causes the current in the circuit including armature 58 to change. The circuit is so arranged that any tendency for the armature voltage to change in one sense is compensated for by a corresponding change in an opposite sense in the current through the armature, whereby the armature speed is maintained at a constant value.

Capacitor 64 functions in a manner similar to capacitor 24 of Figure 1. Thus, when the motor is first started, capacitor 64 rapidly charges, effectively by-passing potentiometer 52. During the charging interval the biasing current through transistor 56 increases and this increased current is amplified by the transistor so that the current through the armature 58 also is increased. This momentarily increases the torque of the motor and enables it to start rapidly. Adjustment of resistor 54, adjusts the amount of bias current to transistor 56 at the moment of starting, which in turn adjusts the starting torque of the motor.

What is claimed is:

1. A motor control circuit comprising, in combination, connections for a source of direct potential; a semi-conductor having an emitter electrode, collector electrode and base electrode; means coupled to said connections for deriving from said source a predetermined amount of biasing current and applying the same to the base-to-emitter circuit of said semi-conductor; and a motor having an armature and field, said armature being connected in series with the emitter-to-collector circuit of said semi-conductor and the connections for said source of direct potential.

2. A motor control circuit as set forth in claim 1, further including a storage capacitor connected to said armature and in series with the base-to-emitter circuit of said semi-conductor.

3. A motor control circuit as set forth in claim 1, further including a storage capacitor connected in series with the base-to-emitter circuit of said semi-conductor and said armature.

4. A motor control circuit as set forth in claim 1, wherein said semi-conductor comprises a PNP type of transistor.

5. A motor control circuit as set forth in claim 1, wherein said semi-conductor comprises an NPN type of transistor.

6. In combination, a motor having an armature and field; a transistor having a collector electrode, an emitter electrode and a base electrode; a source of direct potential connected across the series circuit of said armature, and the collector-to-emitter circuit of said transistor; and resistor means connected between one terminal of said source of direct potential and the base electrode of said transistor for applying a forward biasing current to the base-to-emitter circuit of said transistor.

7. In combination, connections for a source of direct potential; a first device of the type which permits a predetermined amount of current to flow therethrough in response to a predetermined electric bias applied thereto; means for applying a predetermined electric bias to said device; an electric motor having an armature and field, said armature being connected in series with said constant current device, and the series circuit of said constant current device and armature being connected across said connections; a source of reference potential; a second device of the type which permits a predetermined amount of current to flow therethrough in response to a predetermined electric bias applied thereto; circuit means for comparing the voltage across said armature with said reference potential and deriving therefrom, when they are different, an electrical bias; means for applying said last-named electrical bias to said second device for adjusting the amount of current conducted by said second device; and means responsive to the current conducted by said second device for adjusting to a new value the predetermined electrical bias applied to said first device.

8. In the combination as set forth in claim 7, further including means responsive to the initial application of power to said motor for adjusting said predetermined electrical bias to permit a relatively large amount of starting current to flow through said armature during a predetermined interval of time.

9. In the combination as set forth in claim 7, further including means for adjusting the value of said reference potential.

10. In combination, connections for a source of direct potential; a first transistor having an emitter, collector and base; means for applying a predetermined amount of forward biasing current to the base-to-emitter circuit of said transistor; an electric motor having an armature and field, said armature being connected in series with the emitter-to-collector circuit of said transistor, and said series circuit being connected across said connections; a source of reference potential; a second transistor having a collector, emitter and base, the base-to-emitter circuit of said second transistor being connected in series between said source of reference potential and the junction of said armature and first transistor, whereby, when said reference potential is different from that at said junction, emitter-to-base current flows through said second transistor, and collector-to-emitter current flows through said second transistor; and connection means for supplying the collector-to-emitter current of said second transistor to the base-to-emitter circuit of said first transistor for supplementing the biasing current normally supplied to said first transistor.

11. In the combination as set forth in claim 10, further including a storage device connected in series in the base-to-emitter circuit of said first transistor.

12. In the combination as set forth in claim 10, further including a storage capacitor connected between one of said connections and the base-to-emitter circuit of said first transistor.

13. In the combination as set forth in claim 10, said source of reference potential comprising a potentiometer connected across said connections, the reference potential being available at the tap on said potentiometer, said means for applying a predetermined electrical bias to said device including a potentiometer connected at one end to one of said connections and coupled at the other end to the base-to-emitter circuit of said first transistor, and a storage capacitor connected across said last-named potentiometer.

14. In combination, a motor having an armature and a field; a control voltage responsive constant current device, normally supplied with a control voltage of predetermined value, in series with the motor armature for normally limiting the current through the armature to a predetermined value; and control means in circuit with the motor armature and the constant current device and responsive to sudden changes in the voltage across the motor armature for altering the control voltage supplied to the constant current device.

15. In the combination as set forth in claim 14, said control means comprising a storage capacitor.

16. In combination, a motor having a field and an armature; a constant current device in series with said armature for normally limiting the current through the armature to a predetermined value; and control means in circuit with the motor armature and the constant current device and responsive to the rate of change of voltage across the armature for altering the current output of the constant current device in a sense to tend to compensate for said change.

17. In combination, a semiconductor having a base electrode, emitter electrode and control electrode; a motor having a field and an armature, said armature being connected in series with the collector-to-emitter circuit of said semiconductor; and control means in circuit with the motor armature and in series with the base-to-emitter circuit of said semiconductor, and responsive to the rate of change of voltage across the armature for altering the bias current through the base-to-emitter circuit of said semiconductor.

18. In combination, a motor having an armature and field; a transistor having a collector electrode, an emitter electrode and a base electrode; a source of direct potential connected across the series circuit of said armature, and the collector-to-emitter circuit of said transistor; resistor means connected between one terminal of said source of direct potential and the base electrode of said transistor for applying a forward biasing current to the base-to-emitter circuit of said transistor; and a storage capacitor connected at least across a portion of said resistor means.

19. In the combination as set forth in claim 18, at least a portion of said resistor means comprising an adjustable resistor.

20. A control circuit for a motor having an armature and field comprising, in combination, a constant current device in series with the armature, said device having a control element to which a bias may be applied for controlling the amount of constant current which flows through said armature; sensing means connected to said armature for sensing the armature voltage and, when it differs from a given value, producing a control voltage; and means responsive to said control voltage for adjusting the bias on said control element.

21. In the combination as set forth in claim 20, said sensing means comprising a transistor, the base of which is connected to a source of constant voltage and the emitter of which is connected between said armature and said constant current device.

22. In the combination as set forth in claim 20, said constant current device comprising a transistor and said control element comprising the transistor base electrode.

23. A motor control circuit comprising, in combination: connections for a source of direct potential; a constant current device having a control element to which an electrical bias may be applied for controlling the amount of constant current which flows through said device; means for applying a predetermined electrical bias to said control element; connections for a motor having an armature and field, said connections for said armature being connected in series with said constant current device; the series circuit of said constant current device and armature being connected across said source connections; and means in circuit with said armature and said device responsive to instantaneous changes in the voltage across said armature for adjusting said electrical bias.

References Cited in the file of this patent

UNITED STATES PATENTS

| | | |
|---|---|---|
| 2,293,079 | Ranke | Aug. 18, 1942 |
| 2,537,677 | Knauth et al. | Jan. 9, 1951 |